United States Patent
Bebenburg et al.

[15] 3,681,366
[45] Aug. 1, 1972

[54] INDANYL OR TETRALYL AMINO SUBSTITUTED AMINOPYRIDINES

[72] Inventors: Walter V. Bebenburg; Kurt Thiele, both of Frankfurt/Main, Germany

[73] Assignee: Deutsche Gold-und Silber-Scheideanstalt vormals Roessler, Frankfurt (Main), Germany

[22] Filed: April 17, 1970

[21] Appl. No.: 29,655

[30] Foreign Application Priority Data

April 22, 1969 Austria ..................... A 3889/69

[52] U.S. Cl....260/295.5 B, 260/247.1, 260/247.2 B, 260/293.56, 260/293.58, 260/294.8 C, 260/295 F, 424/248, 424/266, 424/267
[51] Int. Cl. ............................................C07d 31/36
[58] Field of Search...260/295.5 A, 295.5 B, 294.8 C

[56] References Cited

UNITED STATES PATENTS 3,567,765  3/1971  Thiele...................260/295 AM

*Primary Examiner*—Alan L. Rotman
*Attorney*—Cushman, Darby & Cushman

[57] ABSTRACT

Compounds are prepared having the formula

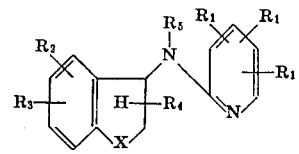

where the $R_1$ groups are the same or different, at least one $R_1$ group is amino or lower alkyl-amino or acylated amino as given below and the other $R_1$ groups are hydrogen, amino, lower alkyl substituted amino, amino acylated with saturated or unsaturated carboxylic acids or with carbonic acid monoesters, or possibly alkylated carbonic acid semiamide or possibly alkylated carbonic acid semihydrazide, or carbonic acid semi morpholide, or carbonic acid semi piperidide, $R_2$ and $R_3$ are the same or different and are hydrogen, halogen, lower alkyl, lower haloalkyl, lower alkoxy, lower acyloxy, hydroxy, mercapto, lower alkyl thio, lower acyl thio, nitro, carboxy, lower carbalkoxy, possibly lower alkyl substituted carbamoyl, lower alkyl amino, amino or amino or lower alkylamino acylated as in $R_1$, $R_4$ is hydrogen, lower alkyl or phenyl, $R_5$ is hydrogen, lower saturated alkyl, phenalkyl or acyl as defined for $R_1$, X is oxygen, methylene, ethylene or oxymethylene, their optically active or diastereometric forms, salts and quaternary compounds. The compounds have antiphlogistic and analgesic activity.

9 Claims, No Drawings

INDANYL OR TETRALYL AMINO SUBSTITUTED AMINOPYRIDINES

The present invention is directed to new compounds of the general formula

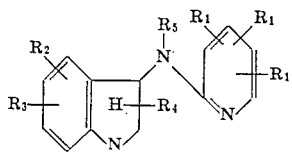

I where the $R_1$ groups are the same or different and are hydrogen, amino, lower alkylamino, amino acylated with saturated and unsaturated carboxylic acids or with carbonic acid monoesters, or possibly alkylated carbonic acid semi amide, or possibly alkylated carbonic acid semihydrazide, or carbonic acid semimorpholide or carbonic semi piperide. At least one $R_1$ group is amino or lower alkyl substituted amino or acylated amino as given above. $R_2$ and $R_3$ are the same or different and are hydrogen, halogen, lower alkyl, lower haloalkyl, lower alkoxy, lower acyloxy, hydroxy, mercapto, lower alkylthio lower acyl thio, nitro, carboxy, lower carbalkoxy, possibly lower alkyl substituted carbamoyl or lower alkylamino, amino, lower alkylamino or amino acylated as in $R_1$, $R_4$ is hydrogen, lower alkyl, or phenyl, $R_5$ is hydrogen lower saturated alkyl, phenalkyl or acyl as defined for $R_1$, and X is oxygen, methylene, ethylene, or oxymethylene, their optically active or diastereometric forms, their pharmacologically acceptable salts and quaternary ammonium compounds.

The alkyl group unless otherwise stated can be straight or branched chain as well as saturated or unsaturated and preferably contains one to six carbon atoms, e.g. methyl, ethyl, isopropyl, propyl, butyl, sec. butyl, amyl, hexyl, vinyl, allyl, methallyl. This is also true if the alkyl group represents a partial constituent of another of the above mentioned substituents, for example, for the acyl group, alkoxy group, carbalkoxy group, alkylamino group, acyloxy group, etc. In regard to the haloalkyl group, it is preferable that the same carbon atom is substituted with three halogen atoms, the trifluoromethyl group being especially preferred.

The aliphatic acyl group can in a given case be substituted by oxo-, hydroxy or alkoxy groups or by halogen atoms. As acyl groups, which are derived from carbonic acid monoesters, the aliphatic esters are of especial note.

The amino groups or amino groups and hydrazine groups as partial constituents of another substituent, as for example in the form of the carbamoyl group or the carbonic acid semiamide or carbonic acid semi hydrazide can be alkylated and can have all their available hydrogen atoms replaced by alkyl group.

As quaternary compounds within the scope of the invention there are contemplated such compound in which the $R_5$ group substituted nitrogen is substituted by a further saturated alkyl group or a phenalkyl group.

The compounds of the invention are useful as therapeutic substances and have a good antiphlogistic and analgesic activity.

The compounds of the invention can be produced in known ways such as the following a. in a compound according to formula I wherein at least one group $R_1$, $R_2$ or $R_3$ signifies a nitro group by reducing at least one nitro group to an amino group, b. reacting a compound of the general formula

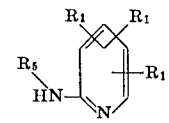

II with a compound of the general formula

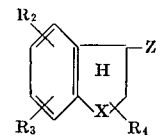

III where Z is either a halogen atom or the group $NHR_5$ or the group $—OR_6$ where $R_6$ is hydrogen, lower alkyl or phenyl with or without a solvent, preferably in the presence of a condensation agent at elevated temperature, or c. condensing a compound of general formula II with a compound of general formula

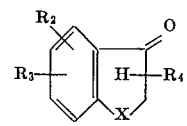

IV with simultaneous reduction, or d. reacting a compound of general formula

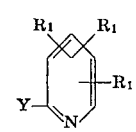

V where Y is either a halogen atom or a hydroxy group or lower alkoxy or phenoxy or the group — $SO_2CH_3$ or — $SO_3A$ and A is hydrogen or an alkali metal with a compound of the general formula

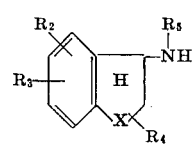

VI with or without a solvent as under (b) and in a given case acylating the amino groups present in the compounds obtained in processes (a) through (d) simultaneously or successively with an acid derivative of one of the above given acids and/or in a given case in a compound of general formula I whose acyl group is derived from an oxo group containing acid reducing this oxo group or groups in known way to a hydroxyl group or groups and/or in a given case in compounds of formula I change individual substituents by acylation, esterification, ester interchange or reaction with an amine or hydrazine into another of the above named substituents within formula I.

For the reduction corresponding to process (a), especially suitable is catalytic hydrogenation. As catalysts there can be used Raney nickel, noble metals such as palladium and platinum as well as their compounds, with or without carriers such as, for example, barium sulfate, calcium sulfate, etc. It is recommended to hydrogenate the nitro groups at a temperature between 20° and 80° C and a pressure of about five to fifty atmospheres absolute in a solvent, for example, alcohols, e.g. methyl alcohol, ethyl alcohol, isopropyl alcohol, dioxane, tetrahydrofurane, etc. For the subsequent isolation of the reduced compounds in many cases it is advantageous to add at the beginning to the mixture to be hydrogenated drying agents such as anhydrous sodium sulfate or magnesium sulfate.

The reduction, however, can also be carried out with nascent hydrogen, formed from zinc-hydrochloric acid, tin-hydrochloric acid, iron-hydrochloric acid or with salts of hydrogen sulfide in alcohol-water at about 70° to about 120° C or with activated aluminum in aqueous ether at 20° to 40° C or with stannous chloride.

Procedures (b) and (d) are suitably carried out at temperatures between 80° and 250° C in which in the case of procedure (b) if Z is hydroxyl, in a given case higher temperatures up to 400° C are necessary. Procedure (c) is suitably carried out at temperatures between 20° and 150° C.

As solvents for procedures (b) through (d), for example, there can be used water, alcohols, e.g. methyl alcohol, ethyl alcohol, isopropyl alcohol, benzene, toluene, dioxane, dimethyl formamide, N-methyl pyrrolidone, dimethyl sulfone, sulfolane, tetramethyl urea, etc.

As condensations for procedures (b) and (d) when Z and Y are halogen, the most important are, for example, sodium acetate, sodium amide, alkali carbonates, e.g. sodium carbonate and potassium carbonate and tertiary amines, e.g. triethyl amine. Zinc chloride, phosphorus oxychloride, p-toluene sulfonic acid, iodine and the like can be used, for example, as condensation agents in procedure (b) when Z is the $NHR_5$ group. There can be used zinc chloride, calcium chloride and triethyl phosphate and for procedures (b) and (d) when Z and Y designate a hydroxyl group or the $R_6O$ group.

For procedure (d), zinc chloride or copper bronze are suitable when Y is $SO_3A$.

The subsequent acylation of the amino groups can be accomplished by known methods with suitable acid chlorides acid anhydrides, esters or ketenes.

If the $R_5$ residue carrying amino group is not to be acylated, there are used acid halides or acid anhydrides at temperatures below 60° C, preferably at 0° to 30°C.

When several amino groups of the above mentioned type are present, a partial acylation is possible if there is used only a sufficient amount of acylating agent for one amino group, in which event the non acylated amino group is converted to the hydrochloride in case the acylation is carried out with an acid halide, e.g. an acid chloride.

The acylation of the amino nitrogen which can be substituted by the $R_5$ group, which likewise preferably takes place after the hydrogenation, can likewise be carried out with acid halides or acid anhydrides. In this case, temperatures above 60° C, preferably between 70° and 120° C, should be maintained. Additionally longer reaction times are required.

Frequently the hydrogenation solution directly after being freed from the catalyst can be employed for the acylation. Since the free amine is most sensitive to oxygen, one works suitably in a nitrogen atmosphere.

The reduction of the oxo group set forth supra can be carried out, for example, with nascent hydrogen, catalytically energized hydrogen or with metal hydrides or complex metal hydrides such as $NaBH_4$, $LiAlH_4$, etc. In the use of $NaBH_4$ and in the catalytic hydrogenation as solvents, there are suited, for example, low polar solvents such as methanol and isopropanel; if other complex hydrides are used, suitable solvents include dioxane, tetrahydrofurane as well as other oxygen containing, but less polar solvents. The reaction temperatures generally are between 20° and 100° C. In the catalytic hydrogenation a pressure between one and 50 atmospheres absolute.

The reduction of the oxo group can take place before or after the acylation reaction.

In the further reactions designated acylation, esterification, ester interchange or reaction with an amine or hydrazine referred to supra, all of which are known conventional chemical processes, there are concerned in detail the following reactions.

1. Acylation: Acylation of an aliphatic or aromatic hydroxy group. This acylation in a given case can take place together with the acylation of the amino groups.

2. Ester interchange: Reaction of a carbalkoxy group or a carbonic acid mono ester groups (as an acylamino group) with an alcohol, e.g. methyl alcohol, ethyl alcohol, propyl alcohol, hexyl alcohol with exchange of the ester radical. This reaction is carried out conveniently with an excess of alcohol which provides the alkyl group of the new ester. The reaction is carried out in the presence of acid catalysts such as hydrochloric acid, toluene sulfonic acid, etc. at temperatures, for example, between 20° and 100° C, whereby in a given case the alcohol formed in the reaction is distilled off provided its boiling point is lower than that of the newly introduced alcohol.

3. Esterification: Esterification of a carboxy group to the carbalkoxy group.

4. Reaction with an amine or hydrazine. Reaction of a carbalkoxy group or a carbonic acid monoester group (as the acylamino group) with ammonia, hydrazine, morpholine or piperidine to form the corresponding carbamoyl group. This reaction also proceeds, for example, with aromatic derivatives of carbonic acid, that is derivatives which are derived from aromatic carbonic acid half esters, such as, for example, carbonic acid half phenyl ester. The reaction also can naturally take place on a carboxy group.

The compounds can be converted into their salts in all known ways. For the production of quaternary compounds there is used appropriately processes (b) and (d), whereby, however, the nitrogen atom combined with the $R_5$ residue is tertiary and is substituted by a lower alkyl group or phenalkyl group.

As ions for the salts or quaternary compounds there can be used the previously known and therapeutically useful acid residues.

Those compounds which contain an asymmetric carbon atom and as a rule precipitate as racemates can be split in known manner, for example, by means of an optically active acid into the optically active isomers. It is also possible to add optically active or diastereomers initially whereby as the end product there is obtained a correspondingly pure, optically active form or diastereomeric configuration.

The compounds of the invention are suited for the production of pharmaceutical compositions. The pharmaceutical compositions or medicaments can include one or more of the compounds of the invention or mixtures of these with other pharmaceutically active materials as well as in a given case, further there can be used as additives further pharmaceutical carriers. They can be used enterally parenterally, orally or perlingually.

The dosage for use of the compounds is usually between 10 mg and 200 mg per kilogram of body weight.

They can be used for human, veterinary and agricultural purposes. Thus they can be used on mice, dogs and cats in the dosages indicated above.

The compounds of the invention also are useful as curing agents for melamine-formaldehyde resins, particularly when used in the form of their salts.

EXAMPLE 1

2-Amino-3-carbethoxyamino-6-[indanyl-(1)-amino]-pyridine hydrochloride

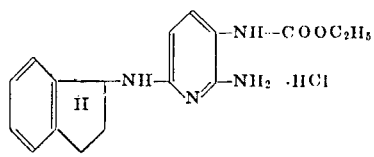

21 grams of 2-amino-3-nitro-6-[indanyl-(1)-amino]-pyridine were hydrogenated with 15 grams of Raney nickel and 30 grams of magnesium sulfate in 500 ml of dioxane at 50° C and 40 atmospheres absolute. The hydrogenation solution was freed of the catalyst and drying agent and treated with 13.5 grams of ethyl chloroformate (chloroformic acid ethyl ester) with stirring. There were added about 100 ml of ether. The substance began to crystallize after a few minutes. It was recrystallized from ethanol. M.P. 187°–189° C, Yield 12 grams.

EXAMPLE 2

2-Amino-3-carbethoxyamino-6-[5,7-dimethyl-indanyl-(1)-amino]-pyridine hydrochloride

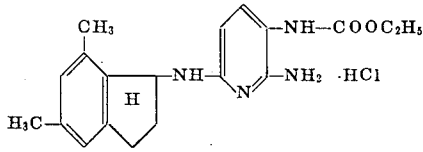

36 grams of 2-amino-3-nitro-6-[5,7-dimethyl indanyl-(1)-amino]-pyridine were hydrogenated with 15 grams of Raney nickel and 50 grams of magnesium sulfate in 200 ml of dioxane at 50° C and 40 atmospheres absolute. The hydrogenation solution was further worked up as in example 1. The crystalline product was recrystallized from isopropanol, M.P. 170°–171° C, Yield 30 grams.

EXAMPLE 3

2-Amino-3-(3-oxo-butyrylamino)-6-[5,7-dimethyl-indanyl-(1)-amino]-pyridine maleate

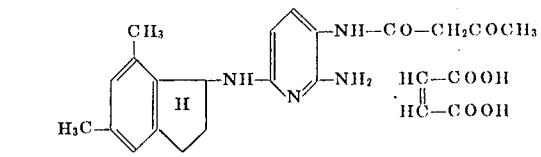

36 grams of 2-amino-3-nitro-6- 5,7-dimethyl-indanyl-(1)-amino -pyridine were hydrogenated with 15 grams of Raney nickel and 50 grams of magnesium sulfate in 200 ml of dioxane at 50° C and 40 atmospheres (absolute). The hydrogenation solution was treated with stirring with 10 ml of freshly distilled diketene. After the fading of the weakly exothermic reaction, there was added a solution of 15 grams of maleic acid in 100 ml of dioxane and 100 ml of ether. The pure product crystallized out upon inoculation. M.P. 135°–140° C, Yield 16 grams.

EXAMPLE 4

2-Amino-3-carbethoxyamino-6-[2-phenyl-indanyl-(1)-amino]-pyridine hydrochloride

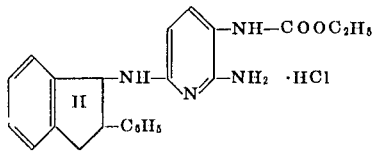

20 grams of 2-amino-3-nitro-6-[-2-phenyl-indanyl-(1)-amino]-pyridine were hydrogenated with 15 grams of Raney nickel and 30 grams of magnesium sulfate in 450 ml of dioxane at 60° C and 40 atmospheres absolute. The hydrogenation solution was worked up as in example 1. After the reaction there was added gasoline until turbidity developed. The substance crystallized upon inoculation. It was recrystallized from ethanol. M.P. 175°–177° C, Yield 14.5 grams.

EXAMPLE 5

2-amino-3-carbethoxyamino-6-[5-methoxy-indanyl-(1)-amino]-pyridine hydrochloride

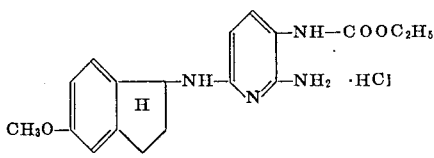

28.5 grams of 2-amino-3-nitro-6-[5-methoxy-indanyl-(1)-amino]-pyridine were hydrogenated as in example 1 and the filtered starting solution reacted with 10.4 ml of ethyl chloroformate. The substance crystallized out. After removal by suction, it was recrystallized from ethanol. Yield 30 grams, M.P. 160°–162° C.

EXAMPLE 6

2-Amino-3-carbethoxyamino-6-[5-fluoro-indanyl-(1)-amino]-pyridine hydrochloride

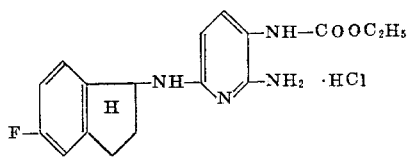

14 grams of 2-amino-3-nitro-6-[5-fluoro-indanyl-(1)-amino]-pyridine was hydrogenated as in example 1 and the starting solution after filtration reacted with 5.5 ml of ethyl chloroformate. After one hour it was treated with either until turbidity remained, whereupon the substance crystallized. It was recrystallized from ethanol. Yield 12 grams. M.P. 200° C.

EXAMPLE 7

2-Amino-3-carbethoxyamino-6-[3-methyl-indanyl-(1)-amino]-pyridine malonate.

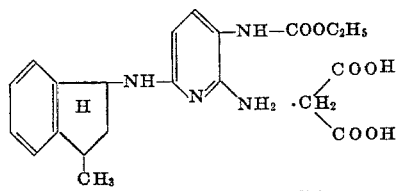

30 grams of 2-amino-3-nitro-6-[3-methyl-indanyl-(1)-amino]-pyridine were hydrogenated as in example 1 and the solution freed of catalyst was than reacted with 11 ml of ethyl chloroformate. The reaction product was precipitated as a syrupy hydrochloride with ether. This was dissolved in a little methanol, made alkaline with aqueous ammonia, the base extracted with ether and the extract washed with water. The dried ether solution was stirred slowly into a solution of 10 grams of malonic acid in a little dioxane, whereupon the malonate crystallized out. It was recrystallized from a little methanol. M.P. 180°–181° C, Yield 12.4 grams.

EXAMPLE 8

2-Amino-3-carbethoxyamino-6-[tetralyl-(1)-amino]-pyridine hydrochloride

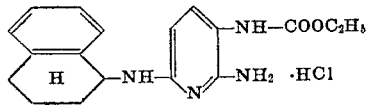

39 grams of 2-amino-3-nitro-6-[tetralyl-(1)-amino]-pyridine were hydrogenated as in example 1. The filtered starting solution was reacted with 11.2 ml of ethyl chloroformate and after one hour treated with ether to the point of turbidity. The substance crystallized by triturating. It was recrystallized from water. Yield 20 grams, M.P. 167°–169° C.

EXAMPLE 9

2-Amino-3-carbethoxyamino-6-[5-methoxy-tetralyl-(1)-amino]-pyridine maleate

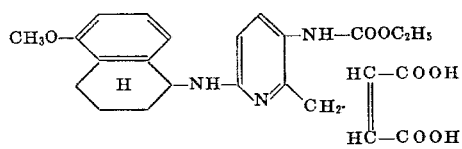

50 grams of 2-amino-3-nitro-6-[5methoxy-tetralyl-(1)-amino]-pyridine were hydrogenated as in example 1 and the filtered starting solution reacted with 17 ml of ethyl chloroformate. By the addition of ether and gasoline, the reaction product precipitated as a syrup. This was dissolved in a little methanol, made alkaline with aqueous ammonia and extracted by shaking with ether. The ether solution was washed several times with water, dried, and then slowly added to a solution of 20 grams of maleic acid in 100 ml of dioxane. The salt crystallized out. It was recrystallized from ethanol. Yield 32 grams, M.P. 146° C.

EXAMPLE 10

2-Amino-3-carbethoxyamino-6-[chromanyl-(4)-amino]-pyridine hydrochloride

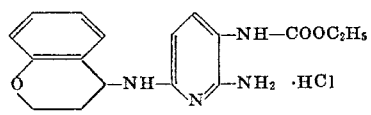

10.5 grams of 2-amino-3-nitro-6- chromanyl-(4)-amino-pyridine in 200 ml of dioxane were hydrogenated as in example 1, the filtered solution reacted with 4 ml of ethyl chloroformate and after 1 hour treated with ether up to turbidity. By trituration the reaction product crystallized out and it was recrystallized from ethanol. M.P. 170° C, Yield 10 grams.

EXAMPLE 11

2-amino-3-carbethoxyamino-6-[5-chloro-indanyl-(1)-amino]-pyridine hydrochloride

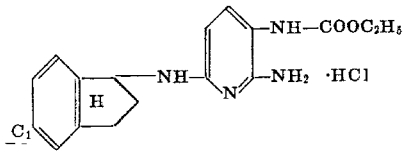

20 grams of 2-amino-3-nitro-6-[5-chloro-indanyl-(1)-amino]-pyridine were hydrogenated in 300 ml of dioxane by addition of 20 grams of magnesium sulfate with 10 grams of Raney nickel at 50° C and 50 atmospheres absolute. The filtered hydrogenation solution was subsequently reacted with 7 ml of ethyl chloroformate with stirring. The precipitated reaction product was removed by suction after 30 minutes and recrystallized from alcohol. Yield 15 grams, M.P. 210° C.

EXAMPLE 12

2-Amino-3-carbethoxyamino-6-[3,5,7-trimethyl-indanyl-(1)-amino]pyridine malonate

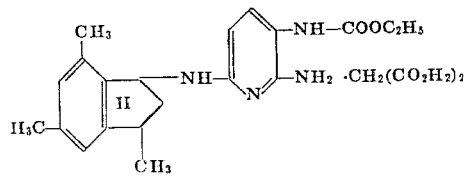

16 grams of 2-amino-3-nitro-6-[3,5,7-trimethyl-indanyl-(1)-amino]-pyridine were hydrogenated as in example 1 and the hydrogenation solution reacted with 6 ml of ethyl chloroformate. By addition of ether, the reaction product was precipitated as a syrup, this was dissolved in a little methanol, treated with excess aqueous ammonia and the base extracted with ether. The ether solution was washed with water and dried and then with stirring was added to a solution of six grams of malonic acid in a little ether, whereupon the malonate crystallized out. The salt which was removed by suction was analytically pure. Yield 11 grams, M.P. 150°–152° C.

EXAMPLE 13

2-Amino-3-carbethoxyamino-6-[2,3-dihydro-cumaronyl-(3)-amino]-pyridine hydrochloride

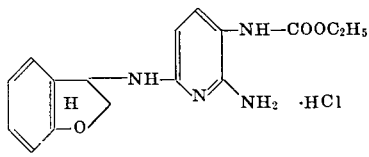

18.5 grams of 2-amino-3-nitro-6-[2,3-dihydro-cumaronyl-(3)-amino]-pyridine were hydrogenated as in example 11 and the hydrogenation solution reacted with stirring with 7.5 ml of ethyl chloroformate. After one hour the crystalline reaction product was removed by suction and recrystallized from ethanol. Yield 16 grams, M.P. 193° C.

EXAMPLE 14

2-Amino-3-carbethoxyamino-6-[5,7-dimethyl-chromanyl-(4)-amino]-pyridine malonate

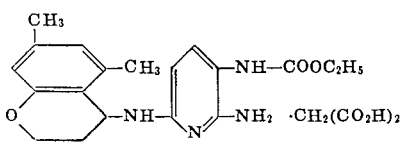

10 grams of 2-amino-3-nitro-6-[5,7-dimethyl-chromanyl-(4)-amino]-pyridine were hydrogenated in 300 ml of dioxane as in example 11, and the hydrogenation solution with stirring reacted with 3.5 ml of ethyl chloroformate. The dioxane was carefully drawn off in a vacuum, the free base made from the residue with aqueous ammonia and then taken up in ether. To the dried ether solution there was added a solution of 3 grams of malonic acid in ether, whereupon the salt precipitated, partially as a syrup. Upon long standing pure malonate crystallized from the mother liquor. Yield 2 grams, M.P. 150° C.

In addition to the compounds in examples 1-14 above, other examples of compounds within the invention are 2-amino-3-carbmethoxyamino-6-[indanyl-(1)-amino]pyridine hydrochloride, 2-amino-3-carbisopropoxyamino-6-[5,7-dimethyl-indanyl-(1)-amino]-pyridine-hydrochloride, 2-amino-3-carb-butoxyamino-6-[2-phenyl-indanyl-(1)-amino]-pyridine hydrochloride, 2-amino-3-carbhexoxy-amino-6-[5-methoxy-indanyl-(1)-amino]-pyridine hydrochloride, 2-amino-3-carb-sec.butoxyamino-6-[5-propoxy-indanyl-(1)-amino]-pyridine malonate, 2-amino-3-carbethoxy-6-[5-trifluoromethyl-tetralyl-(1)-amino]-pyridine maleate, 2-amino-3-(acetyl-amino)-6-[5-bromo-indanyl-(1)-amino]-pyridine hydrobromide, 2-amino-3-(propionylamino)-6-[5-ethyl-indanyl-(1)-amino]-pyridine malonate, 2-amino-3-(butyrylamino)-6-[2-propyl-indanyl-(1)-amino]-pyridine hydrochloride, 2-amino-3-carbopropoxyamino-6-[5-bromo-indanyl-(1)-amino]-pyridine hydrochloride, 2-amino-3-carbethoxy-amino-6-[5-methyl-7-chloro-indanyl-(1)-amino]-pyridine hydrochloride, 2-amino-3-(acetylamino)-6-[5-hydroxy-indanyl-(1)-methylamino]-pyridine malonate, 2-amino-3-(carbethoxyamino)-6-[5,7-dihydroxy-indanyl-(1)-butylamino]-pyridine malonate, 2-amino-3-(carbopropoxyamino)-6-[5-mercapto-tetralyl-(1)-amino]-pyridine maleate, 2-amino-3-carbmorpholidoamino-6-]indanyl-(1)-amino]-pyridine hydrochloride, 2-amino-3-carbpiperididoamino-6-[indanyl-(1)-amino]-pyridine acetate, 2-amino-3-(carbphen-oxyamino)-6-[chromanyl-(4)-amino]-pyridine hydrochloride.

EXAMPLE 15

2-amino-3-carbethoxyamino-6-[6,8-dimethyl-tetralyl-(1)]-aminopyridine

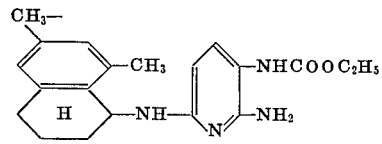

17.5 grams of 2-amino-3-nitro-6-[6,8-dimethyl-(1)]-aminopyridine were catalytically hydrogenated as in Example 1. The filtered hydrogenation solution was reacted with 6 ml. of ethyl chloroformate with stirring. After 1 hour, the dioxane was distilled off in a vacuum to a residual volume of 100 ml., the residue treated with aqueous ammonia and 300 ml. of ether and the solution washed several times with water. The ether phase was dried, filtered and treated with gasoline (B.P. 60°–80° C.) until turbidity remained. The base crystallized out by trituration. It was recrystallized from benzene-gasoline ( 2 : 1 by volume). M.P. 160° C., Yield 12 grams.

EXAMPLE 16

2- amino-3-carbethoxyamino-6-[3-ethyl-5,7-dimethyl-indanyl-(1)]-aminopyridine

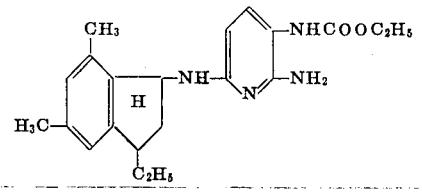

23 grams of 2-amino-3-nitro-6-[3-ethyl-5,7-dimethyl-indanyl-(1)]-aminopyridine were hydrogenated as in Example 1. The filtered hydrogenation solution was reacted with 7.6 ml. of ethyl chloroformate with stirring. After an hour, the reaction product was precipitated from the reaction solution as a syrup by the addition of ether and gasoline. This syrup was dissolved in a little methanol, made alkaline with aqueous ammonia and extracted by shaking with ether. The ether solution was washed several times with water, dried and then slowly added to a solution of 20 grams of maleic acid in 100 ml. of dioxane. The salt crystallized out. It was recrystallized from ethanol. Yield 13 grams, M.P. 138°–140° C.

EXAMPLE 17

2-amino-3-carbethoxyamino-6-[2,5,7-trimethylindanyl-(1)]-aminopyridine

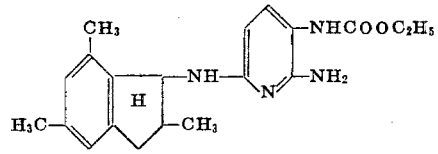

15 grams of 2-amino-3-nitro-6-[2,5,7-trimethyl-indanyl-(1)]-aminopyridine were catalytically hydrogenated as in Example 1. The filtered hydrogenation solution was reacted with 5.5 grams of ethyl chloroformate. After one hour, the reaction product was precipitated as syrup by the addition of ether and gasoline. This syrup was dissolved in a little methanol, made alkaline with aqueous ammonia and extracted by shaking with ether. The ether solution was washed several times with water, dried and then slowly added to a solution of 20 grams of maleic acid in 100 ml. It was recrystallized from ethanol. Yield 6 grams, M.P. 136°–138° C.

EXAMPLE 18

2-methylamino-3-carbethoxyamino-6-indanyl-(1)-aminopyridine

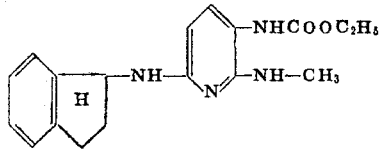

35 grams of 2-methylamino-3-nitro-6-indanyl-(1)-aminopyridine were catalytically hydrogenated as in Example 1. The filtered hydrogenation solution was reacted with 13 ml. of ethyl chloroformate. The hydrochloride which crystallized out was analytically pure. Yield 25 grams, M.P. 198°–199° C.

EXAMPLE 19

2-indanyl(1)-amino-5-carbethoxyaminopyridine

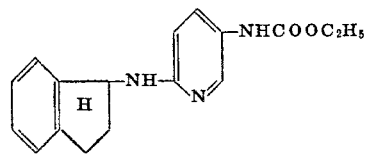

16 grams of 2-indanyl-(1)-amino-5-nitropyridine were hydrogenated as in Example 1. The filtered hydrogenation solution was reacted with 7 ml. of ethyl chloroformate with the addtion of 6 ml. of pyridine and stirring. After three hours, the solvent was volatilized in a vacuum, the residue taken up in a little acetone and brought to crystallization with ether. The substance was recrystallized three times from ethanol. Yield four grams, M.P. 119°–120° C.

The starting materials employed in process (a) also are new materials. The starting materials can be produced for example by reacting a compound of the general formula

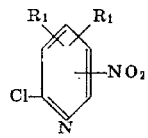

with a compound of the general formula

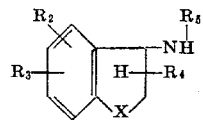

with or without a solvent, suitably at temperature between 0° – 200° C in the presence of a hydrochlorine acid acceptor, as for example excess of the reacting amine or tertiary amines, sodium carbonate, potassium carbonate, etc. An especially important starting material is 2-amino-3-nitro-6-chloro-pyridine which can be obtained for example by reaction of 2,6-dichloro-3-nitropyridine with aqueous ammonia at 100° C. The production of such starting materials is given in examples A–C below it being realized that any of the other nitro starting materials can be prepared in similar fashion.

EXAMPLE A 6-chloro-3-nitro-2-aminopyridine

The solution of 4 grams (about 0.02 mole) of 2,6-dichloro-3-nitropyridine in 60 ml. of alcohol were treated an aqueous ammonia solution prepared from 2.2 grams ammonium chloride and 1.6 grams of NaOH in 15 ml. of water (containing about 0,04 mole $NH_3$) and the mixture, after addition of a further 60 ml. of alcohol heated in a tube for 2 hours in a boiling water bath. The product which crystallized out on cooling was filtered off under vacuum, washed with water and recrystallized from methanol.

M.P. 195°–196° C., yield 3 grams.

EXAMPLE B 2-indanyl-(1)-amino-5-nitropyridine

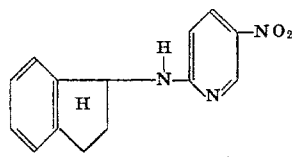

A mixture of 20 grams of 2-chloro-5-nitropyridine, 25 grams of 1-aminoindane, 25 grams of potassium carbonate and 70 ml. of n-propanol were heated at reflux for three hours with stirring. The inorganic salts were filtered off with suction while hot. After addition of some gasoline the nitro compound precipitated out of the filtrate. Yield 16 grams, M.P. 135°–137° C.

EXAMPLE C 2-amino-3-nitro-6-[5,7-dimethylindanyl-(1)]-aminopyridine

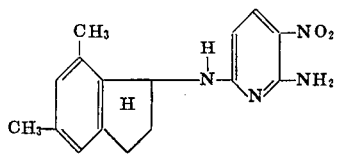

A mixture of 56 grams of 2-amino-3-nitro-6-chloropyridine, 59 grams of 5, 7-dimethyl-1-aminoindane, 46 grams of potassium carbonate and 100 ml. of n-propanol were heated at reflux for 2.5 hours with stirring. The inorganic salts were filtered off with suction while hot. The nitro compound crystallized out of the filtrate. Yield 78 grams, M.P. 157°–159° C.

The compound of example C is the intermediate used to prepare the compound of example 2.

The compound of example B is the intermediate used to prepare the compound of example 20.

The compounds according to the invention have valuable pharmaceutical properties and are especially useful because of their strong antiphlogistic action. They are effective on the carrageenin-edema of the rat-paw in doses of 0.1 – 500 mg/kg. The best of the compounds exert a reduction of this edema of 50 percent with a dose of 1.5 mg/kg (orally). Comparable activity is shown by the known antiphlogistic Salicylamid at doses of 200 mg/kg. Thus it is obvious, that the compounds according to the invention are superior to Salicyalmid.

In addition, some of the compounds have analgesic activity in doses of 0.1 – 500 mg/kg. The most active compounds cause analgesy among 50 percent of a group of mice in a dose range between 2 – 100 mg/kg. Comparable activity of the known analgesic phenacetin is effected at doses of ca. 600 mg/kg, showing the superiority of the compounds covered by this invention.

Pharmacological Activity Test Methods

The compounds were tested for antiphlogistic action on the carrageenin edema of the rat paw according to the method of Domenjoz et al., Arch.exp.Pharm.Path.230, 325 (1957).

The test for analgesic effect followed the mouse tail test according to Haffner, Dtsch. Med. Wschr. 55, 731 (1939).

The acute toxicity for mouse (LD 50 in mg 1 kg) was ascertained graphically according to the procedure of Miller and Tainter, Proc.Soc.Exper. Biol. Med. 57, 261 (1944).

The acute toxicity in the mouse lies, expressed as LD 50 between 100 and 4000 mg/kg body weight when administered orally.

What is claimed is:

1. A compound having the formula

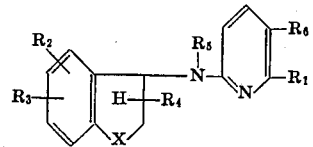

wherein $R_1$ is hydrogen, amino or methylamino, $R_6$ is carb lower alkoxyamino where the alkoxy group has one to six carbon atoms, oxobutyrylamino, or NHCOR$_7$ where $R_7$ is alkyl of one to three carbon atoms, $R_5$ is hydrogen or methyl, $R_2$ is hydrogen, halogen, lower alkyl, lower alkoxy, hydroxy, mercapto or trifluoromethyl, $R_3$ is hydrogen, methyl, chlorine or hydroxyl, $R_4$ is hydrogen, phenyl or lower alkyl, X is $CH_2$, $-CH_2CH_2$, $-O-$ or $-OCH_2-$ and their pharmacologically acceptable salts.

2. A compound according to claim 1 wherein $R_6$ is carb lower alkoxyamino or oxobutyrylamino, $R_5$ is hydrogen, $R_2$ is hydrogen, methyl, methoxy, fluorine or chlorine, $R_3$ is hydrogen or methyl, $R_4$ is hydrogen, phenyl, methyl or ethyl and X is $-CH_2$ or $-CH_2CH_2-$ 3. A compound according to claim 1 wherein $R_1$ is amino.

4. A compound according to claim 3 wherein $R_6$ is carb lower alkoxyamino.

5. A compound where according to claim 1 $R_6$ is carb lower alkoxyamino.

6. A compound according to claim 5 wherein $R_1$ is hydrogen.

7. A compound according to claim 5 wherein $R_2$ is carbethoxyamino.

8. A compound according to claim 1 wherein X is $-CH_2-$.

9. A compound according to claim 1 where X is $-CH_2CH_2-$.

* * * * *